Feb. 10, 1931.  C. N. WISE  1,791,546
MACHINE FOR TRUING AUTOMOBILE BRAKE DRUMS
Filed Dec. 27, 1928  3 Sheets-Sheet 1
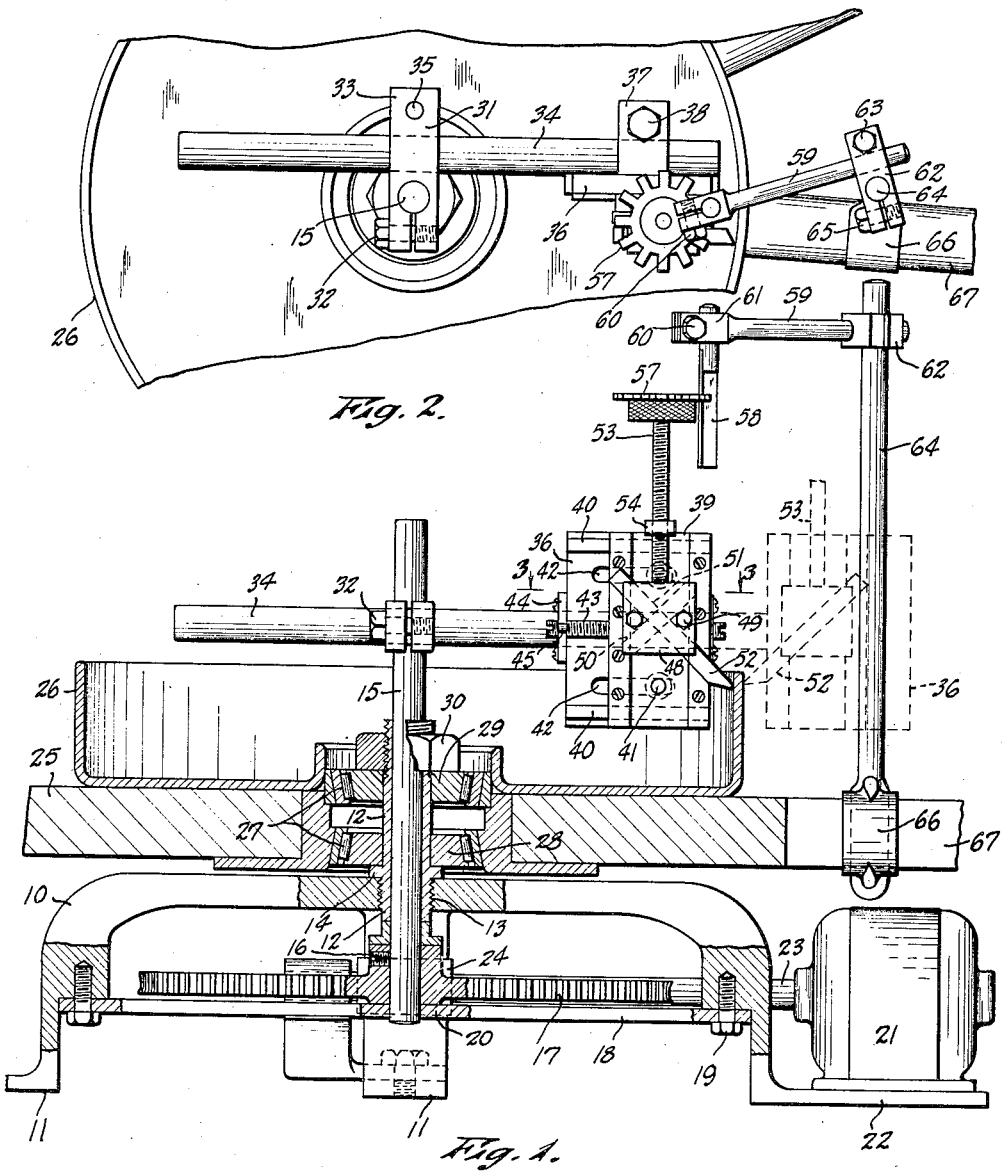
Inventor
Clarence N. Wise
By Wooster & Davis
Attorneys.

Feb. 10, 1931.　　　　C. N. WISE　　　　1,791,546
MACHINE FOR TRUING AUTOMOBILE BRAKE DRUMS
Filed Dec. 27, 1928　　　3 Sheets-Sheet 2

Inventor
Clarence N. Wise
By Wooster & Davis
Attorneys

Feb. 10, 1931.　　　　C. N. WISE　　　　1,791,546
MACHINE FOR TRUING AUTOMOBILE BRAKE DRUMS
Filed Dec. 27, 1928　　　3 Sheets-Sheet 3
Fig. 8.
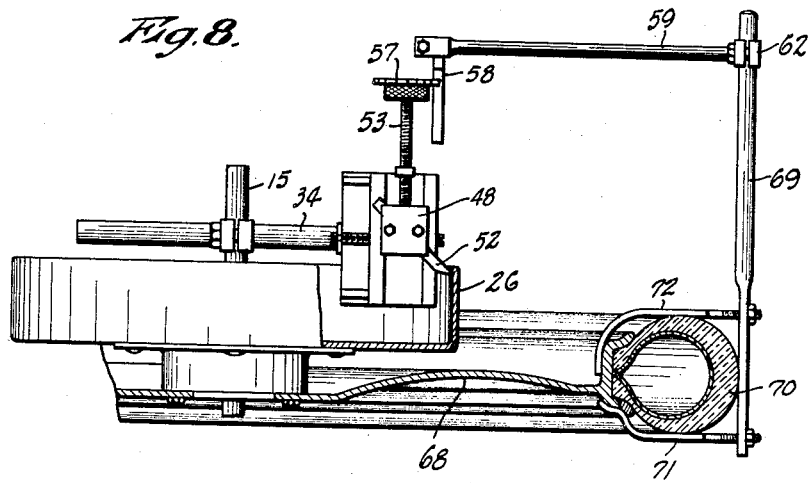
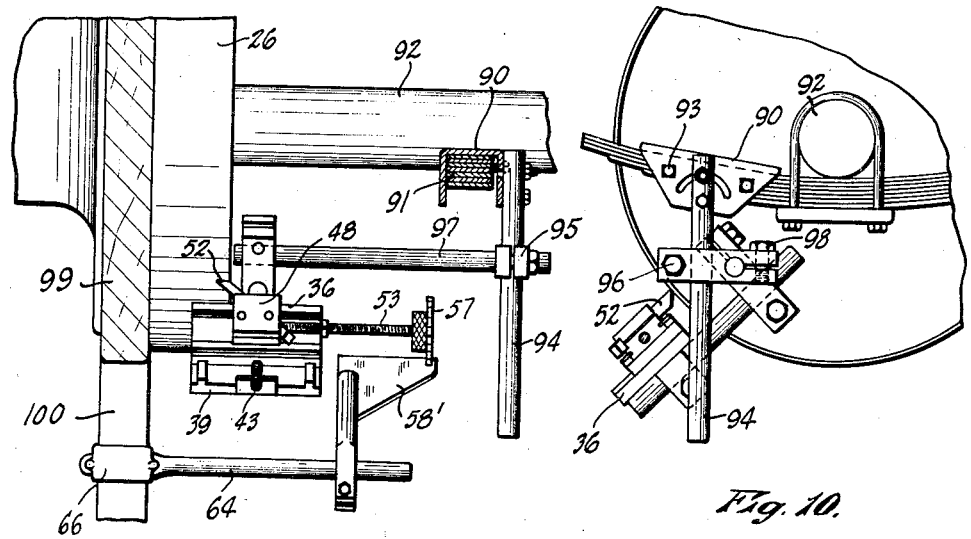
Fig. 9.　　　　　　Fig. 10.
Inventor
Clarence N. Wise
By Wooster & Davis
Attorneys Patented Feb. 10, 1931

1,791,546

UNITED STATES PATENT OFFICE

CLARENCE N. WISE, OF NEW MILFORD, CONNECTICUT

MACHINE FOR TRUING AUTOMOBILE BRAKE DRUMS

Application filed December 27, 1928. Serial No. 328,769.

This invention relates to a device for truing automobile brake drums, and has for an object to provide a device which may be used to true both front and rear wheel brake drums and both the outer and inner surfaces thereof.

It is also an object of the invention to provide a device for this purpose which is of simple construction and is easily portable so that it may be used about an ordinary garage.

Another object of the invention is to provide a device which may be used for either turning or grinding the surfaces of the drum.

With the foregoing and other objects in view, the invention consists in certain novel features of construction, combinations and arrangements of parts as will be more fully disclosed in connection with the accompanying drawings. In these drawings, Fig. 1 is a partial side elevation and partial section showing the device as applied to truing the brake drum of a front wheel of an automobile.

Fig. 2 is a partial top plan view thereof.
Fig. 3 is a detail section substantially on line 3—3 of Fig. 1.

Fig. 4 is a detail section of the connection for the feed screw to the tool carrier.

Fig. 8 is a partial side elevation and partial section showing how the automatic feed may be applied to a disc type of wheel.

Figure 5:
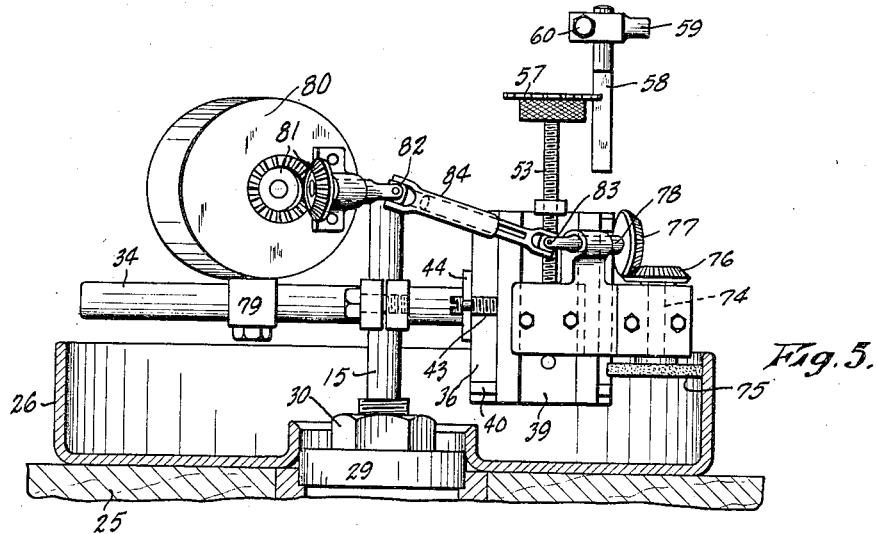
Fig. 5 is a partial side elevation and partial section showing the device as used for grinding the surface of a brake drum.

Fig. 9 is a partial section and partial elevation showing how the device may be used to true the drum of a rear wheel without removing it from the car, and Fig. 10 is an elevation looking from the right of Fig. 9.
In the operation of an automobile if the asbestos brake linings are not renewed until the lining wears down sufficiently so that the heads of the securing rivets project from the surface of the lining these heads will dig into the surface of the drum and score the same, reducing the braking effect and giving unsatisfactory operation. At the present time the common practice of truing up drums which have been scored is to send the wheel to the factory or a large garage having special lathe equipment for truing these drums. I have provided a device which is of simple construction and is easily portable, which may be used in any garage, and may be used for either turning or grinding both the outer and inner surfaces of the drum, and both the drums of front and rear wheels. In the device, as shown in Figs. 1 to 6, the wheels carrying the drums are removed from the vehicle, but in Figs. 7 and 8 I have disclosed a modification of the device which may be used to true the surface of a rear wheel brake drum without removing the wheel from the car.

Referring first to Figs. 1 and 2, the device illustrated comprises a supporting frame or base 10 which may rest on the floor, bench or other suitable support on the feet 11. Extending upwardly from the center of this base is a sleeve 12 which is preferably mounted by threading it into the base, as shown at 13, with a stop shoulder 14 to limit its movement and assist in clamping it to the base. This sleeve forms a bearing for an upright shaft 15. Secured to the lower end of this shaft, either by a suitable key or a set screw 16, is a driving gear 17, and a spider 18 secured in the base as by screws 19 to form a thrust bearing 20 beneath this gear and also a bearing for the lower end of the shaft 15. The gear is driven by any suitable type of gear train from a motor 21, preferably an electric motor, which is mounted on a bracket 22 preferably forming a part of the base 10 or secured thereto. It is preferred that the shaft 23 of the motor carry a worm 24 meshing with the worm gear 17 as this gives a powerful drive.

The wheel of which the drum is to be trued is shown at 25 and carries a brake drum 26. In the showing of Figs. 1 and 2, this is a front wheel and when removed from the car the roller bearings or cups 27 are removed with it. In order to properly center this wheel on the sleeve 12, I provide means which cooperate with these roller bearings or cups to properly center the wheel with respect to the shaft 15. A block 28 is slid onto the shaft 12 and seats against the flange 14 and has an outer tapered peripheral surface corresponding to the lower roller bearing 27. The wheel is placed so as to rest on the block 28 and then a second block 29 the same as block 28 is slid onto the shaft 12 but in reversed position so that its outer tapered peripheral surface will engage the upper roller bearing 27. Clamping nut 30 is then threaded onto the upper end of the sleeve 12 and clamps the blocks 28 and 29 between this nut and the flange 14. These blocks firmly clamp against the roller bearings or cups and automatically center and rigidly mount the wheel on the supporting bed 10.

The tool for finishing the surface of the drum is mounted on the upright shaft 15. An adjustable supporting clamp 31 is secured on the shaft 15. It may be secured with a set screw but is preferably provided with a split bearing thereon so that it may be clamped in any adjusted position by the clamping screw 32. It also has on the opposite side a similar split bearing 33 to receive a transverse rod 34 which may be clamped in any adjusted position in the support 31 by a clamping screw 35. The rod 34 carries a head 36 which has a split bearing 37 embracing the rod and may be clamped in any adjusted position on this rod by a clamping screw 38. Mounted on the head 36 is a plate or block 39. This plate is mounted for movement on the head 36 in a direction longitudinally of the rod 34 and is guided thereon by suitable guides 40 running in grooves in the back of the plate and clamping bolts 41 running in elongated slots 42 in the head. By tightening these bolts 41 the plate may be clamped in adjusted positions on the head 36 and may be adjusted thereon by an adjusting screw 43 threaded into the plate and secured against longitudinal movement in the head 36 by means of securing plates 44 having a notch to receive a reduced portion 45 in the screw.

This plate 39 carries upright guides 46 for a tool holder 47 which is, therefore, slidable vertically on the plate 39. The tool holder 47 includes a clamping plate 48 which may be clamped to the body portion of the holder by the screws 49. The front face of the body of the holder and the rear face of the plate 48 are provided with opposed inclined grooves 50 and 51 for carrying the tool 52. These grooves are arranged right and left hand, as shown in Fig. 1, and are inclined to the horizontal to hold the tool 52 at the proper angle. On the drawing the tool 52 is a turning tool. The tool carrier 47 is adjusted vertically by means of a screw 53 threaded into a lug 54 on the plate 39 and secured to the carrier 47 by any suitable means, such as a transverse pin 55 in a circumferential groove 56 in the screw. If it is desired to turn the inner wall of the drum 26 the tool 52 is mounted on the carrier in the grooves 51, as indicated in full lines. If it is desired to turn the outer surface of the drum the tool 52 is mounted in the grooves 50 and the head is adjusted so as to be outside the drum, as shown in dotted lines.

During the turning operation relative turning movement is provided between the drum and the tool by rotation of the shaft 15 through the gear 17 and the motor 21. As the tool turns it may turn down this inner or outer surface of the drum as desired, and it may be fed transversely of the drum through the screw 53 either by hand or by an automatic feed. In the automatic feed shown the head of the screw 53 is provided with a notched rim 57 to cooperate with a stop 58 carried on any suitable support. In the showing this stop is carried on a transverse bar 59 and is adjustable thereon by loosening the screw 60 in a clamp 61. A second clamp 62 may clamp the rod 59 by the screw 63, and it may be clamped in adjusted position on an upright rod 64 through a clamping screw 65. The rod 64 is mounted by any suitable means on the wheel. In the present drawing it is secured by a clamp 66 on a spoke 67 of the wheel. It will be apparent that as the head 36 rotates the toothed rim 57 will on every revolution engage the stop 58 as it passes by it and the stop will give a partial revolution to the screw. In other words the stop 58 will rotate the screw a step by step movement and progressively feed the tool across the face of the drum.

In Fig. 8 is shown a means for mounting the stop 58 when the device is used for truing the brake drum on a disc wheel. The disc wheel is shown at 68 and is mounted on the sleeve 12 the same as the spoke wheel, indicated in Fig. 1. A clamp comprising an upright rod 69 is secured to this wheel by clamping on the rim and tire 70. A pair of clamping elements 71 and 72 engage on opposite sides of the rim and tire and clamp thereto. The stop 58 is secured to the upright rod 69 by a transverse rod 59 the same as shown in Fig. 1.

Figure 6:
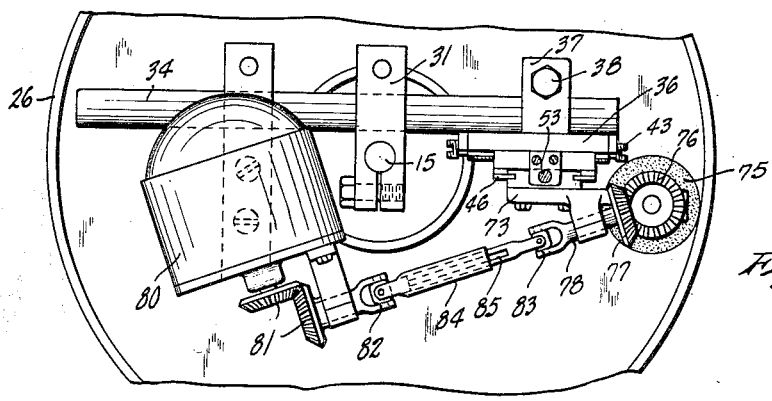
Fig. 6 is a top plan view thereof.

Figs. 5 and 6 show how the device may be used for grinding the surface of the drum instead of turning it. In this arrangement a bracket 73 is mounted in place of the plate 48 on the tool carrier and this plate has bearings for an upright shaft 74 carrying a grinding wheel 75. At its opposite end the shaft is driven by a bevel gear 76 meshing with another bevel gear 77 on a short shaft 78. A bracket 79 carrying a motor 80 is adjustably mounted on the rod 34 and through bevel gears 81, universal couplings 82 and 83 and adjustable shaft 84, this motor will drive the shaft 78 and the grinding wheel 75. The shaft 84 is made in two telescoping sections splined together, as shown at 85, so that one is driven by the other, but they may have relative sliding movement to lengthen or shorten the shaft as the grinding wheel is fed across the surface of the drum. This feeding movement is imparted by the feed screw 53 either by hand or with an automatic step by step movement through the stop 58 the same as shown in Fig. 1.

Figure 7:
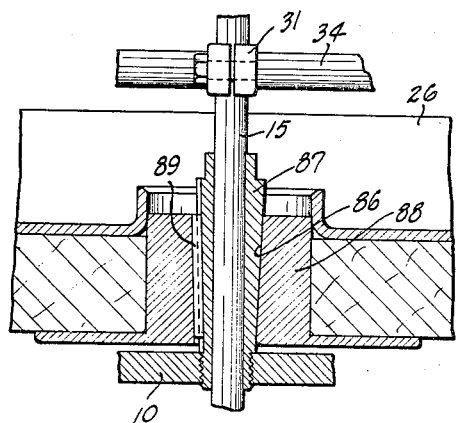
Fig. 7 is a vertical section through the hub of a rear wheel showing how such a wheel may be mounted on the device.

Fig. 7 shows means for mounting the rear wheel of a car. As the rear wheel is rigid on its axle it is generally mounted by a tapered opening 86 on a similarly tapered portion of the axle. I, therefore, provide a similarly tapered plug or sleeve 87 which is inserted in the tapered opening in the hub 88 of the wheel after it is removed from the car and is keyed thereto, as shown at 89. The sleeve 12 of Fig. 1 is then unscrewed from the base 10 and the plug 87 threaded into its place and will rigidly secure the wheel and the brake drum 26 in position for truing, and it is also centered relative to the shaft 15 so that the tool, either the turning tool 52 or the grinding tool 75 may true the surface of the drum the same as shown in Figs. 1 to 6. The hub 88 is not the bearing for the wheel in the sense that the wheel turns on it but it is a bearing for the wheel in the sense that it is supported by it.

In Figs. 9 and 10, I have shown an arrangement whereby the brake drum of a rear wheel may be trued without removing it from the car. In this arrangement a bracket 90 may be mounted on the spring 91 of the rear axle 92 and clamped thereto by any suitable means, such as the screw 93. Adjustably mounted on this bracket is a rod 94 and adjustably mounted on this rod is a clamp 95. The clamp may be adjusted and secured in any position on the rod by means of the clamping screw 96. A transverse rod 97 is adjustably mounted in this clamp 95 and secured in adjusted position by the clamping screw 98. The head 36, as shown in Figs. 1 to 4, is adjustably mounted on this rod 97 and carries the tool 52 in position to turn the surface of the drum 26 on the rear wheel 99. After this mechanism is properly adjusted in position the wheel is jacked up and rotated by the engine to give the relative turning movement between the drum and the tool. The tool is fed transversely of the drum by the feed screw 53 the same as in the first form, and this screw may be operated by hand or automatically with a step by step movement by the stop 58' engaging the toothed rim 57 of the screw. The stop 58' is adjustably mounted on a bar 64 which may be clamped to a spoke 100 of the wheel the same as shown in Fig. 1.

The device is very simple in construction, is light in weight, and requires very little space, is easily portable, or it may be permanently secured to a bench or the floor of a garage, and the form shown in Figs. 1 to 8 may be used in any garage where electric power is available. It is not, however, necessary to operate the device by an electric motor as other types of motors may be used if desired. In using the devices of Figs. 1 to 8 all that is necessary is to remove the wheel from the car, mount it on the base by the securing means as described, adjust the tool to the proper position and then start the motor and the surface of the drum will be trued up automatically.

Having thus set forth the nature of my invention, what I claim is:

1. In a device for truing automobile brake drums, a base, means on said base for mounting a wheel carrying a brake drum, a supporting shaft, a rod universally adjustably mounted on said shaft, a tool carrier universally adjustable on said rod, means for causing a relative turning movement between the carrier and the drum, and means for feeding the carrier longitudinally of the axis of the drum.

2. In a device for truing automobile brake drums, means for supporting a wheel carrying a brake drum, a shaft on said supporting means, a rod universally adjustably mounted on said shaft, a tool carrier, means for adjustably universally mounting the tool carrier on said rod, means for causing relative turning movement between the drum and the carrier, and means for feeding the carrier in a direction transversely of the drum.

3. In a device for truing automobile brake drums, a support for a tool carrier, means including a rotatable shaft for mounting the carrier and a wheel carrying a drum for relative turning movements, means for feeding the carrier transversely of the drum, and means detachably secured to the wheel for cooperating with the feeding means to operate the same.

4. In a device for truing automobile brake drums, a support for a tool carrier, means including a rotatable shaft for mounting the carrier and a wheel carrying a drum for relative turning movements, a screw for feeding the carrier transversely of the drum, a stop carried by the wheel, a head secured to the screw, and means on the head to engage the stop to turn the screw with a step by step movement by said relative turning movements between the wheel and carrier.

5. In a device for truing automobile brake drums, a base, means carried by said base to cooperate with the hub of a wheel carrying a brake drum to support and center the wheel on the base, a shaft coaxial with said wheel supporting means, a tool carrier, means for adjustably mounting the carrier on said shaft, means for causing relative turning movement between the shaft and drum, and means for feeding the tool carrier in a direction transversely of the drum.

6. In a device for truing automobile brake drums, a base, an upright shaft, a support on the base capable of cooperating with the bearing in an automobile wheel carrying a brake drum to support said wheel coaxial with the shaft, means for rotating the shaft, a tool carrier mounted on the shaft, and means for feeding the tool carrier in a direction transverse the drum.

7. In a device for truing automobile brake drums, a base, an upright sleeve secured to the base providing means for securing a wheel carrying a brake drum, an upright shaft mounted to turn in said sleeve, means for rotating the shaft, a tool carrier mounted on the shaft, and means for feeding the carrier transversely of the drum.

8. In a device for truing automobile brake drums, a base, means on the base for securing a wheel carrying a brake drum, an upright shaft coaxial with said means, a head adjustably mounted on said shaft, a tool carrier on said head, means on the carrier capable of supporting a tool to true either the outside or inside surface of the drum, means for rotating the shaft, and means for feeding the tool carrier transversely of the drum.

9. In a device for truing automobile brake drums, a base, means on the base for securing a wheel carrying a brake drum, a shaft coaxial with the wheel, means adjustably mounted on the shaft for carrying a tool including a block having means for clamping a tool to turn either the inner or outer surface of the drum, means for feeding the carrier transversely of the drum, and means for rotating the shaft.

10. In a device for truing automobile brake drums, a head, means for mounting said head for substantially universal adjustment relative to the drum, a plate mounted to slide transversely of the head for adjustment thereon, a tool carrier mounted to slide on said plate at right angles to its movement, means for feeding the tool carrier, and means for giving relative rotary movement between the drum and tool carrier.

In testimony whereof I affix my signature.

CLARENCE N. WISE.